United States Patent [19]
Allain et al.

[11] Patent Number: 5,379,370
[45] Date of Patent: Jan. 3, 1995

[54] METHOD AND APPARATUS FOR DRAWING LINES, CURVES, AND POINTS COINCIDENT WITH A SURFACE

[75] Inventors: John E. Allain, Ossining; Bruce D. Lucas, Yorktown Heights, both of N.Y.

[73] Assignee: International Business Machines Corporation, Armonk, N.Y.

[21] Appl. No.: 916,323

[22] Filed: Jul. 17, 1992

[51] Int. Cl.⁶ ............................................. G06F 15/72
[52] U.S. Cl. ................................. 395/122; 395/125; 395/129; 395/130
[58] Field of Search ............... 395/125, 129, 122, 130

[56] References Cited

U.S. PATENT DOCUMENTS

| | | | |
|---|---|---|---|
| 4,491,868 | 1/1985 | Berridge, Jr. et al. | 358/139 |
| 4,682,217 | 7/1987 | David et al. | 358/89 |
| 4,875,097 | 10/1989 | Jackson | 358/180 |
| 4,882,679 | 11/1989 | Tuy et al. | 364/413.22 |
| 5,068,803 | 11/1991 | Valdes et al. | 395/150 |
| 5,245,700 | 9/1993 | Fossum | 395/125 X |

FOREIGN PATENT DOCUMENTS

| | | |
|---|---|---|
| 0429285A3 | 5/1991 | European Pat. Off. . |
| 0447154A2 | 9/1991 | European Pat. Off. . |
| 0465036A2 | 1/1992 | European Pat. Off. . |

*Primary Examiner*—Mark K. Zimmerman
*Attorney, Agent, or Firm*—Perman & Green

[57] ABSTRACT

A method, for execution by a graphics processing system (10), for rendering objects for display to a viewer upon a display (20) having a plurality of display pixels. The method includes the steps of, for a surface to be displayed having a surface marking coincident therewith, (a) moving the surface marking towards the viewer or, alternatively, moving the surface away from the viewer, by an amount that is function of a parameter (S) and also a scale factor (K) that expresses a relationship between viewer eye coordinate units and display pixel units. The parameter (S) determines a maximum slope for the surface, relative to a viewing plane, such that the step of moving will not cause a portion of the surface marking to be obscured by the surface. The step of moving includes a step of (b) applying a predetermined transformation $T'_e$ from a viewer eye coordinate system to a modified viewer eye coordinate system. The predetermined transformation $T'_e$ is selected as a function of whether a perspective projection or an orthographic projection of the surface and surface marking upon a viewing plane is performed. For the perspective projection, the transformation $T'_e$ is shown to also compensate for the movement of the second object towards the viewer.

19 Claims, 2 Drawing Sheets

METHOD AND APPARATUS FOR DRAWING LINES, CURVES, AND POINTS COINCIDENT WITH A SURFACE

FIELD OF THE INVENTION

This invention relates generally to graphics processing systems and, in particular, to methods of rendering objects for display upon a display monitor.

BACKGROUND OF THE INVENTION

In computer graphics applications it is frequently desirable to draw lines, curves and points in three dimensional space that are spatially coincident with a surface in three dimensional space, and which are required to be visible on the surface. Such objects may be characterized as "surface markings," and occur in a wide range of applications.

It has been found that a conventional method of drawing lines, curves and points in a computer graphics system induces inaccuracies. These inaccuracies often result in portions of the surface markings disappearing "behind" the surface and, thus, not being displayed in the desired manner.

FIG. 2 illustrates a representative scene consisting of a triangle, suspended in space, that is to be rendered for display together with a surface marking. In FIG. 2 the surface marking has the form of a line that lies on the surface of the triangle. A standard depth buffer (z-buffer) method for rendering this scene employs an area of memory referred to as an image buffer. The image buffer contains one entry for each display monitor pixel center point (represented by + in FIG. 2). Each entry of the image buffer includes a red, green, and blue (RGB) value representing a color for that pixel, and a depth (z) value to represent the distance, from a viewer or viewplane, of the frontmost object processed thus far for that pixel. Before rendering a scene, each image buffer pixel entry is typically initialized to a specified background color and to a z value representing a greatest possible representable distance from the viewer.

For each object in the scene (for example the triangle and the line in FIG. 2), the set of pixels covered by that object are enumerated. For each pixel, the RGB color of the object, at that pixel's center point, is calculated. For example, the calculation may be made by interpolating the colors at the vertices (PQR) of the triangle or at the endpoints (ST) of the line. Furthermore, a z value representing the distance of the object from the viewer at the pixel center point is calculated. Each computed z value is compared with the z value already stored in the corresponding entry of the image buffer for that pixel, and if the computed z value at the pixel center is closer to the viewer than the z value currently in the image buffer for that pixel, then for that pixel the current object obscures the closest object processed thus far. As a result, the computed RGB color value and the computed z value replace the values currently stored in the image buffer. When all of the objects are thus processed, the image buffer stores RGB and z values that correspond only to points on objects that lie closest to the viewer, and that are not obscured by a "nearer" object.

Generally the z-buffer approach works well. However, when it is applied to surface markings such as lines, curves and points that are coincident with a surface (such as the line and the triangle in FIG. 2), it is observed that a significant proportion of the pixels of the surface marking may be hidden by the surface and, as a result, not displayed.

Similar problems with two coincident surfaces (as opposed to lines, curves and points coincident with a surface) have been observed to be caused by numerical roundoff errors resulting from a limit on the precision of the computer representation of the z values. However, it has further been determined by the inventors that this is not the cause of the problem in the case of surface markings. As a result, methods that have been devised to deal with roundoff errors in the z values do not solve the problem of obscured surface markings. By example, a method that employs toleranced depth tests to overcome roundoff errors is disclosed in commonly assigned U.S. patent application Ser. No. 07/672,058, filed Mar. 12, 1991, entitled "Direct Display of CSG Expression by Use of Depth Buffers" by D. A. Epstein, J. R. Rossignac, and J. W. Wu.

It is thus an object of this invention to provide a method to render surface markings so that a portion or portions of the surface markings are not obscured by the surface which they are intended to mark.

SUMMARY OF THE INVENTION

The foregoing and other problems are overcome and the object of the invention is realized by a method for execution by a graphics processing system for rendering objects for display to a viewer upon a display having a plurality of display pixels. The method includes the steps of, for a surface to be displayed having a surface marking coincident therewith, (a) moving or displacing the surface marking towards the viewer or, alternatively, moving the surface away from the viewer, by an amount that is function of a parameter (S) and also a scale factor that expresses a relationship between viewer eye coordinate units and display pixel units. The parameter (S) determines a maximum slope for the surface, relative to a viewing plane, such that the step of moving will not cause a portion of the surface marking to be obscured by the surface. The step of moving includes a step of (b) applying a predetermined transformation ($T'_e$) from a viewer eye coordinate system to a modified viewer eye coordinate system.

The parameter (S) may equal $|\Delta z/\Delta x|$, or $|\Delta z/\Delta y|$, or a combination of $|\Delta z/\Delta x|$ and $|\Delta z/\Delta y|$, in an (x, y, z) viewer coordinate system. In the case of a perspective transformation, $T'_e$ also compensates for the movement of the surface marking towards the viewer.

The predetermined transformation $T'_e$ is selected as a function of whether a perspective projection or an orthographic projection of the surface and the surface marking upon a viewing plane is performed.

For the orthographic projection, it is shown that the scale factor K is given by $$K = \frac{\text{horizontal resolution in pixels}}{\text{width of field of view } (FOV)}.$$

It is also shown that the amount of movement is given by S/2K, and therefore that a modified viewer coordinate system z-axis distance value $z'_e$ is given in terms of an unmodified viewer coordinate system z-axis distance value $z_e$ as $$z'_e = z_e + S/2K.$$

Therefore, for the orthographic projection the predetermined transformation $T'_e$ is given by:

$$T_e = \begin{bmatrix} 1 & 0 & 0 & 0 \\ 0 & 1 & 0 & 0 \\ 0 & 0 & 1 & S/2K \\ 0 & 0 & 0 & 1 \end{bmatrix}.$$

For the perspective projection it is shown that the scale factor K is given by $$K = \frac{\text{horizontal resolution in pixels}}{\text{width of (FOV) at a distance of 1 unit from viewer}}.$$

It is also shown that the amount of movement is given by $z_e S/2K$, where $z_e$ is a distance along an unmodified viewer coordinate system z-axis. It is further shown that a modified viewer coordinate system z-axis distance value $z'_e$ is given in terms of the unmodified viewer coordinate system z-axis distance value $z_e$ as:

$$z'_e = z_e - z_e S/2K = z_e(1 - S/2K).$$

Therefore, for the perspective projection the predetermined transformation $T'_e$ is given by:

$$T_e = \begin{bmatrix} 1-S/2K & 0 & 0 & 0 \\ 0 & 1-S/2K & 0 & 0 \\ 0 & 0 & 1-S/2K & 0 \\ 0 & 0 & 0 & 1 \end{bmatrix}.$$

That is, the method of this invention modifies the eye coordinates $[x_e \; y_e \; z_e]$ to obtain in their place modified eye coordinates $[x'_e \; y'_e \; z'_e]$. This is achieved by moving a surface marking closer to the viewer, or by moving the surface further from the viewer, prior to applying a screen transform $T_s$. One preferred method for accomplishing this operation is by inserting the additional transform $T'_e$ into the set of transformations that transform from object coordinates, to world coordinates $(T_w)$, to eye coordinates $(T_e)$, and finally to screen coordinates $(T_s)$. Using a conventional 4×4 homogenous coordinate system notation, one suitable expression for this improved transformation is:

$$[wx_s wy_s wz_s w] = [x_0 y_0 z_0 1] T_w T_e T'_e T_s.$$

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1A:
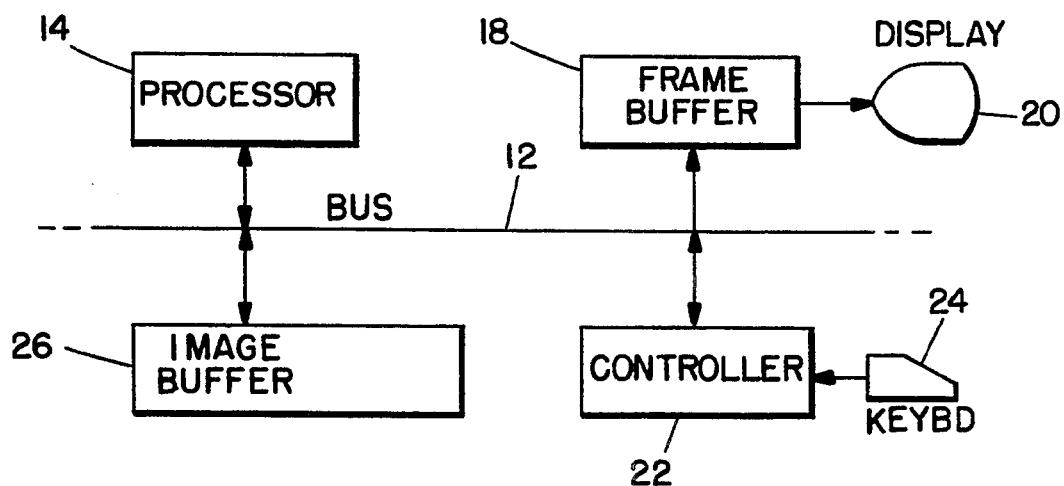
FIG. 1a is a simplified block diagram of a first embodiment of a graphics rendering system that is constructed and operated in accordance with the invention.

The inventors have determined that the source of the problem of the obscured surface markings is not intuitively obvious, and that an understanding of the problem requires a careful analysis of the method used to draw lines, curves, and points in a computer graphics system, such as one shown in FIG. 1a.

Before describing the method of the invention in detail, reference is made to FIG. 1a wherein there is depicted a computers graphics system 10 that is suitable for implementing the method of the invention. The system 10 includes a digital bus 12 that couples together a data processor 14, a memory 16, a frame buffer 18 that is coupled to a display monitor 20, and an I/O controller 22 having a user entry device, such as a keyboard 24, coupled thereto. Preferably the display 20 is a high resolution color graphics display. The processor 14 processes image data that is provided thereto over the bus 12 to create a displayable image in an image buffer 26, and executes a program to implement the method of the invention that is described in detail below. The contents of image buffer 26 are subsequently moved across the bus 12 to the frame buffer 18 for display on the display monitor 20.

Figure 1B:
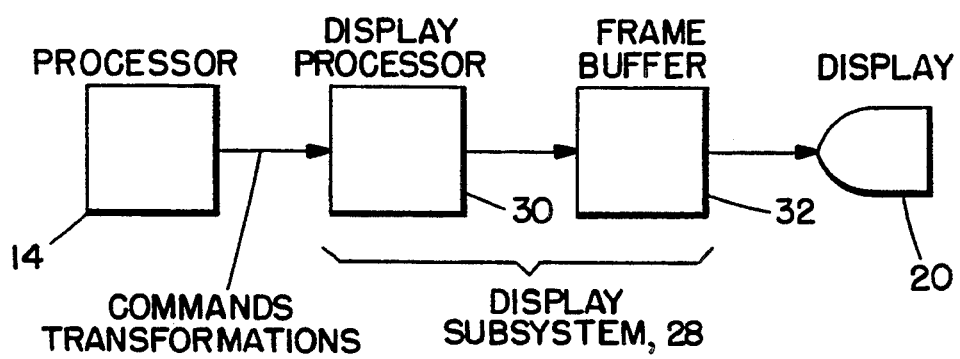
FIG. 1b is a simplified block diagram of a second embodiment of a graphics rendering system that is constructed and operated in accordance with the invention.

FIG. 1b illustrates another computer graphics system that is suitable for practicing the invention. In FIG. 1b the processor 14 provides graphics commands and data, including predetermined transformations, to a graphics display subsystem 28. Graphics display subsystem 28 includes a dedicate display processor 30 having an output coupled to a frame buffer 32. The display processor 30 operates on the graphics commands, such as Display a Triangle, in accordance with the predetermined transformations (described below), to render objects for display. Pixels representing surfaces of objects, including surface markings as appropriate, are stored within the frame buffer 32. The output of the frame buffer 32 provides display pixel data to the display 20.

Figure 2:
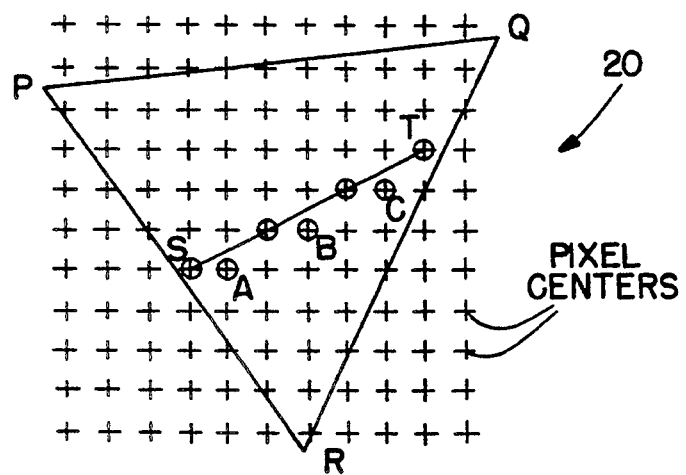
FIG. 2 illustrates a scene consisting of a triangle PQR and a line ST, wherein pixel centers are indicated by (+), the line is approximated by pixels designated ⊕, and wherein approximating pixels A, B, C are one-half pixel from the line ST.

Consideration is again made of the line ST shown in FIG. 2. In that, in general, a line drawn between any two given endpoints does not pass exactly through pixel centers, it is necessary to approximate the line by illuminating the pixels (indicated by ⊕ FIG. 2) whose centers are closest to the desired geometric line. However, the centers of the approximating pixels may be as far as one-half of a pixel width away from the desired geometric line.

It is noted that a similar one-half pixel error is possible in the case of curves and points. However, the remainder of this discussion treats only the case of lines, it being realized that the problem for curves and points is analogous, and that the solution provided by the invention is exactly the same. These objects (lines, curves and points) are collectively referred to herein as "surface markings".

The above mentioned pixel approximation has been determined by the inventors to be the cause of the non-displayed surface marking pixels. That is, some pixels of the line will not be visible if the line is coincident with a surface (such as the triangle PQR in FIG. 2) and if the surface is sloped. This is because the z values that are used for the pixels that approximate the line ST are derived from the z values on the geometric line; but when these z values are applied to nearby approximating pixel centers that are not on the geometric line, the resulting pixel may be hidden by the surface, because the surface has a different z value at the position of the approximating pixel than it has on the geometric line. For example, if the bottom of the triangle PQR is sloped toward the viewer (but the triangle PQR is nevertheless still coincident with the line ST), then the triangle PQR will obscure all of the line's pixels that are below the geometric line, such as the pixels marked A, B and C in FIG. 2.

It is noted that the triangle PQR may be one face of a larger object, and may in some cases represent the result of a tessalation of an object's surface during the rendering process.

The solution provided by the method of the invention can generally be stated as follows: (a) the surface markings are moved toward the viewer by a small amount before rendering, thus bringing the hidden surface marking pixels back into view, or, alternatively, (b) the surface is moved away from the viewer by a small amount before rendering, thus bringing the hidden surface marking pixels back into view. Case (a) is achieved by specifying a positive value for a surface slope (S) parameter. Case (b) is achieved by specifying a negative value for the (S) parameter. Both case (a) and case (b) are considered to be equivalent, and the remainder of the description of the invention is made generally only for the case (a).

Figure 3A:
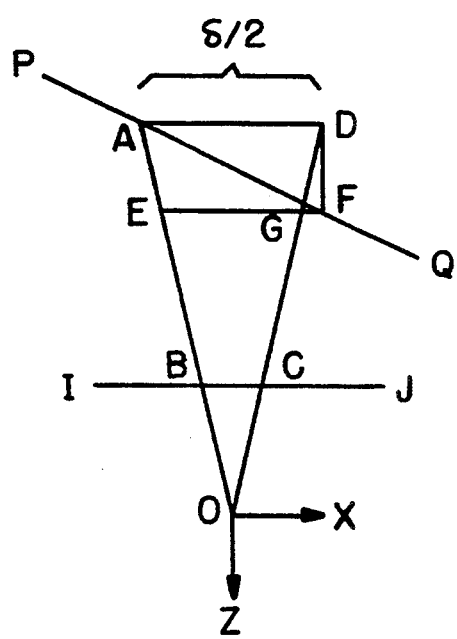
FIGS. 3a and 3b illustrate a perspective projection and an orthographic projection, respectively, and both illustrate a top view with a viewer at an origin O of a viewer coordinate system.
Figure 3B:
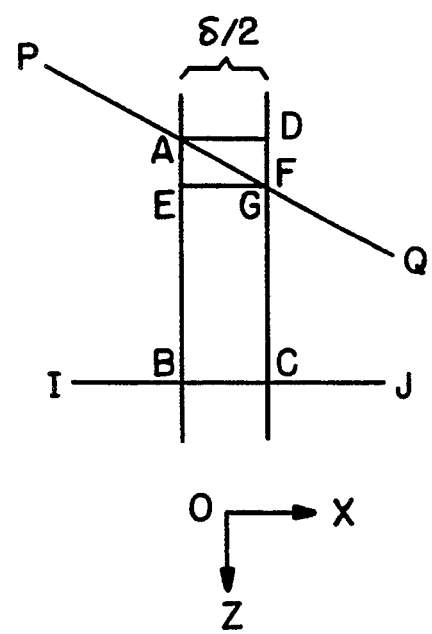

It should be noted that moving the surface markings forward could potentially cause them to be visible in front of another surface which should hide them. Therefore, the amount by which the surface markings are moved must be carefully selected. In addition, a perspective projection requires additional compensation for the fact that moving the surface markings toward the viewer makes the surface markings appear larger. The approach that is taken is illustrated in FIGS. 3a and 3b. FIGS. 3a and 3b illustrate a perspective projection and an orthographic projection, respectively, and both illustrate a top view with a viewer at an origin O of a viewer coordinate system (x, y, z). Surface marking A, which is coincident with plane PQ having a slope parameter S, where $S=|\Delta z/\Delta x|$, projects onto the image plane IJ at position B. In FIGS. 3a and 3b, the term $\Delta z$ is the line segment DF, and the term $\Delta x$ is the line segment AD. The nearest pixel location is C, one-half pixel away, which therefore makes the surface feature appear to be located at D, behind the plane. The apparent spatial error is given by $AD=\delta/2$. As will be shown, and in accordance with the invention, by moving A forward to E, a z distance of $DF=S\delta/2$, the new apparent position G is no longer obscured by the plane PQ. In general, the term $\delta$ is a distance in the viewer coordinate system that corresponds to a pixel error distance, in the viewing plane, in drawing the surface marking against the surface.

It is noted that this example assumes that there is no slope of the surface in the y-dimension. However, the method of the invention applies as well to a slope in y, given by $|\Delta z/\Delta y|$, and to a slope in both x and y. In all cases, the slope parameter (S) is referenced to the image plane IJ, and a slope parameter having a value of zero is considered to be parallel to the image or viewing plane. The value of S may be specified by a user through, by example, the keyboard 24 of FIG. 1a, or may be regarded as a constant.

In greater detail, in FIGS. 3a and 3b it should be observed that a distance of one pixel on the screen corresponds to some distance $\delta$ in eye coordinates, and a one-half pixel error on the screen corresponds to a distance $\delta/2$ in eye coordinates. Therefore, moving the surface markings toward the viewer by some multiple S of $\delta/2$ compensates for the one-half pixel error in drawing a surface marking against a surface that has a slope as large as S, relative to the viewing direction. The value of the slope parameter S is selected so as to minimize the number of pixels missing from surface markings, after applying a transformation $T'_e$ that is described in detail below. The value of the slope parameter S is also selected so as not to create a possibility for surface markings to be visible when they should be hidden by another surface. The inventors have determined that a value for S of approximately eight provides satisfactory results for many applications, although the exact value of S is not critical, so long as a satisfactory display results. In this regard it is noted that errors against highly sloped surfaces are less noticeable in that, in general, highly sloped surfaces cover less display screen area.

There is now described a method that solves the problem of hidden surface markings by modifying the standard transformations used in computer graphics systems, for two commonly used projections, orthographic (FIG. 3b) and perspective (FIG. 3a). In both the orthographic and perspective projections, the standard coordinate transformation process starts with a collection of objects each described in terms of a set of object coordinates $[x_o y_o z_o]$ in its own object coordinate system. Each object is placed into a common world coordinate system by a transform $T_w$ that depends on the relationship between the object coordinate system and the world coordinate system. Next, world coordinates are transformed to "eye" (or "camera" or "viewer") coordinates $[x_e y_e z_e]$ relative to the frame of reference of the viewer by a transform $T_e$. $T_e$ depends on the position and orientation of the viewer relative to the world coordinate system. Finally, eye coordinates are transformed into screen coordinates $[x_s y_s]$, measured in pixels, by a transform $T_s$ that depends on the type of projection (orthographic or perspective), and on the details of the camera. Using a standard 4×4 homogeneous coordinate system notation this transformation is expressed by:

$$[wx_s wy_s wz_s w] = [x_o y_o z_o 1] T_w T_e T_s.$$

The derivation and use of these standard transformations is well known to these skilled in the art. By example, reference in this regard is made to the text "Computer Graphics: Principles and Practice", 2nd Edition J. Foley, A. Van Dam, S. Feiner, and J. Hughes (Addison Wesley 1990). It is noted that the above described set of transformations represent but one suitable approach, and that other approaches can be employed to yield the same result.

The method of this invention modifies the eye coordinates $[x_e y_e z_e]$ to obtain in their place modified eye coordinates $[x'_e y'_e z'_e]$. This is achieved by moving the surface marking closer to the viewer or, as described above, by moving the surface farther from the viewer, prior to applying the screen transform $T_s$. One preferred method for accomplishing this operation is by inserting an additional transform $T'_e$ into the above equation before $T_s$, resulting in:

$$[wx_s wy_s wz_s w] = [x_o y_o z_o 1] T_w T_e T'_e T_s. \quad (1)$$

The details of the transform $T'_e$ depend on whether the screen projection described by $T_s$ is an orthographic or a perspective projection. Both of these projections are now described in detail.

Orthographic projection (FIG. 3b)

In an orthographic projection, screen coordinates [$x_s$ $y_s$] are obtained by taking eye coordinates [$x_e$ $y_e$ $z_e$] and scaling $x_e$ and $y_e$ by some scale factor K:

$$x_s = K x_e, \quad y_s = K y_e. \quad (2)$$

The value of the scale factor K is a function of the width of the field of view in eye-space units, and on the horizontal resolution of the camera in pixels:

$$K = \frac{\text{horizontal resolution in pixels}}{\text{width of field of view (FOV)}}$$

Consider the distance δ in the x or y direction in eye space that corresponds to an apparent distance of one pixel on the screen. The maximum error of one-half pixel that occurs in drawing a surface marking is just compensated for, when the surface marking is drawn against a surface of slope S, by moving the surface marking toward the viewer by a distance of Sδ/2, as shown in FIGS. 3a and 3b.

From equation (2) it can be concluded that the eye-space equivalent δ of a screen pixel, in the case of an orthographic projection (FIG. 3b), is given by $$\delta = 1/K$$

Thus, the amount by which a surface marking is moved towards the viewer to avoid "burying" the surface marking behind a surface of slope S is $$S\delta/2 = S/2K.$$

Accordingly, the modified eye space z coordinate $z'_e$ is given by $$z'_e = z_e + S\delta/2 = z_e + S/2K. \quad (3)$$

As described above in equation (1), the transformation from eye coordinates [$x_e$ $y_e$ $z_e$] to modified eye coordinates [$x'_e$ $y'_e$ $z'_e$] is accomplished in the graphics system 10 by inserting a transform $T'_e$ into the conventional transformation process. Equation (3) for the modified eye coordinate $z'_e$ implies that, for an orthographic projection $T'_e$ is given by $$T_e = \begin{bmatrix} 1 & 0 & 0 & 0 \\ 0 & 1 & 0 & 0 \\ 0 & 0 & 1 & S/2K \\ 0 & 0 & 0 & 1 \end{bmatrix}. \quad (4)$$

Expressed in this form, it can be appreciated by those having skill in the art that the method of the invention is readily incorporated into many graphics systems that allow arbitrary 4×4 homogeneous transformations in the process of converting object coordinates to screen coordinates.

Perspective projection (FIG. 3a)

For a perspective projection, the relationship between screen coordinates [$x_s$ $y_s$] and eye coordinates [$x_e$ $y_e$ $z_e$] is given by $$x_s = K x_e / z_e, \quad y_s = K y_e / z_e, \quad (5)$$

where K is a parameter of the camera and is a function of the angle of view and the resolution (number of pixels) of the camera:

$$K = \frac{\text{horizontal resolution in pixels}}{\text{width of FOV at a distance of 1 unit from viewer}},$$

where the 1 unit is expressed in the viewer coordinate system.

Considering the distance δ in the x or y direction in eye space that corresponds to an apparent distance of one pixel on the screen; the maximum error of one-half pixel that occurs in drawing a surface marking is compensated for when the surface marking is drawn against a surface of slope S by moving the surface marking toward the viewer by a distance of Sδ/2, as shown in FIG. 3a.

From equation 5 it can be concluded that the eye-space equivalent δ of a screen pixel, in the case of a perspective projection, is given by $$\delta = -z_e / K.$$

It is noted that the minus sign results from the fact that in the conventional eye-space coordinate system the $z_e$ values increase towards the viewer, with $z_e = 0$ at the viewer, so that the $z_e$ values for visible objects in front of the camera are negative. It is further noted that in some approaches the opposite convention for $z_e$ is adopted. For these approaches, the minus sign is eliminated from the foregoing equation and from the subsequent equations appearing below.

Thus, the amount by which the surface marking is moved toward the viewer to avoid "burying" the surface marking behind a surface of slope S is given by:

$$S\delta/2 = z_e S/2K.$$

As a result, the modified eye space coordinate $z'_e$ is given by $$z'_e = z_e + S\delta/2 = z_e - z_e S/2K = z_e(1 - S/2K). \quad (6)$$

However, in a perspective projection (unlike an orthographic projection), the screen coordinates [$x_s$ $y_s$] depend on $z_e$. As a result, modifying $z_e$ to $z'_e$ causes the size and position of the object on the screen to shift, resulting in object to appear misregistered relative to other objects. Fortunately, the modification of $z_e$ to obtain the term $z'_e$ is purely multiplicative (by a factor of $1-S/2K$ as shown in equation (6)). In that $x_s$ and $y_s$ are proportional to $1/z_e$, as shown in equation (5), the misalignment is avoided by similarly multiplying $x_e$ and $y_e$ by a factor of $1-S/2K$:

$$x'_e = x_e(1 - S/2K), \quad y'_e = y_e(1 - S/2K). \quad (7)$$

As described in equation (1), the transformation from eye coordinates [$x_e$ $y_e$ $z_e$] to modified eye coordinates [$x'_e$ $y'_e$ $z'_e$] is accomplished in the graphics system 10 by inserting the transform $T'_e$ into the standard transformation process. Equations (6) and (7) for the modified eye coordinates [$x'_e$ $y'_e$ $z'_e$] imply that, for a perspective projection, $T'_{e\,e}$ is given by $$T_e = \begin{bmatrix} 1 - S/2K & 0 & 0 & 0 \\ 0 & 1 - S/2K & 0 & 0 \\ 0 & 0 & 1 - S/2K & 0 \\ 0 & 0 & 0 & 1 \end{bmatrix} \quad (8)$$

Expressed in this form, it can further be appreciated by those having skill in the art that this method of the invention is also readily incorporated into many graphics systems that allow arbitrary 4×4 homogeneous transformations in the process of converting object coordinates to screen coordinates.

In summary, the inventors have identified a cause of a problem of missing pixels when rendering surface markings such as lines, curves, and points that are coincident with a surface. The problem has been determined to result from pixel-location inaccuracies in drawing the surface markings. The inventors have also provided methods for solving the problem by moving the surface markings toward the viewer, as summarized by equations (1), (4) and (8). The methods of the invention are widely applicable, in that they are readily incorporated into many conventional graphics systems. The methods provide for the user to select a parameter S that represents a maximum surface slope, relative to the viewer, for which the missing pixels will be completely avoided. Too large a value for S may result in the opposite error of surface markings being visible when they should be obscured by another surface. A value for S of approximately eight has been shown to provide good results, although the exact value of S is not critical.

If, by example, triangle PQR is one face of a geodesic sphere, and if each face includes surface markings, then some large subset of faces will be inclined with a slope of less than eight and will thus not hide the surface markings. For those faces that are inclined with a slope of greater than eight, their projection upon the view plane IJ will generally encompass a small area and, as result, any missing surface marking pixels will not be as visually apparent.

Although described in the context of a planar surface (triangle PQR) it should be understood that the methods described herein are applicable in general to situations wherein pixel-location inaccuracies exist in the rendering of a surface marking against either a planar or a curved surface.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for execution by a graphics processing system for rendering, for display to a viewer upon display means having a plurality of display pixels, a surface having a surface marking coincident therewith, comprising the steps of:

moving the surface marking towards the viewer or, alternatively, moving the surface away from the viewer, by an amount that is function of a parameter (S) and also a scale factor (K) that expresses a relationship between viewer eye coordinate units and display pixel units, wherein the parameter (S) determines a maximum slope for the surface, relative to a viewing plane, such that the step of moving will not cause a portion of the surface marking to be obscured by the surface; and wherein the step of moving includes a step of applying a predetermined transformation ($T'_e$) from a viewer eye coordinate system to a modified viewer eye coordinate system, wherein the predetermined transformation $T'_e$ is selected as a function of a selected type of projection of the surface and the surface marking upon a viewing plane.

2. The method of claim 1, wherein (S)=$|\Delta z/\Delta x|$, or wherein (S)=$|\Delta z/\Delta y|$, or wherein (S) equals a combination of $|\Delta z/\Delta x|$ and $|\Delta z/\Delta y|$ in an (x, y, z) viewer coordinate system.

3. A method as set forth in claim 1 wherein (S) is equal to approximately eight.

4. A method as set forth in claim 1 wherein the predetermined transformation $T'_e$ is selected as a function of whether a perspective projection or an orthographic projection of the surface and the surface marking upon a viewing plane is performed.

5. A method as set forth in claim 4 wherein, for the orthographic projection, the scale factor K is given by $$K = \frac{\text{horizontal resolution in pixels}}{\text{width of field of view } (FOV)},$$

wherein $S\delta/2 = S/2K$, where $\delta$ is a distance in the viewer coordinate system that corresponds to a pixel error distance in the viewing plane that occurs in drawing the surface marking against the surface, wherein a modified viewer coordinate system z-axis distance value $z'_e$ is given in terms of an unmodified viewer coordinate system z-axis distance value $z_e$ as $$z'_e = z_e + S\delta/2 = z_e + S/2K,$$

and wherein the predetermined transformation $T'_e$ is given by $$T_e = \begin{bmatrix} 1 & 0 & 0 & 0 \\ 0 & 1 & 0 & 0 \\ 0 & 0 & 1 & S/2K \\ 0 & 0 & 0 & 1 \end{bmatrix}.$$

6. A method as set forth in claim 4 wherein for the perspective projection the scale factor K is given by $$K = \frac{\text{horizontal resolution in pixels}}{\text{width of } (FOV) \text{ at a distance of 1 unit from viewer}},$$

wherein $S\delta/2 = z_e S/2K$, where $\delta$ is a distance in the viewer coordinate system that corresponds to a pixel error distance, in the viewing plane, that occurs in drawing the surface marking against the surface, and where $z_e$ is a distance along an unmodified viewer coordinate system z-axis, wherein a modified viewer coordinate system z-axis distance value $z'_e$ is given in terms of the unmodified viewer coordinate system z-axis distance value $z_e$ as $$z'_e = z_e + S\delta/2 = z_e - z_e S/2K = z_e(1 - S/2K),$$

and wherein the predetermined transformation $T'_e$ is given by $$T_e = \begin{bmatrix} 1 - S/2K & 0 & 0 & 0 \\ 0 & 1 - S/2K & 0 & 0 \\ 0 & 0 & 1 - S/2K & 0 \\ 0 & 0 & 0 & 1 \end{bmatrix}.$$

7. A method as set forth in claim 1 wherein the transformation T' is applied with a set of transformations that transform from object coordinates, to world coordinates ($T_w$), to eye coordinates ($T_e$), to screen coordinates ($T_s$) in accordance with:

$$[wx_s \: wy_s \: wz_s \: w] = [x_o \: y_o \: z_o \: 1] T_w \: T_e \: T'_e \: T_s,$$

wherein $x_s$, $y_s$, $z_s$ are a screen-based coordinate system, wherein $x_o$, $y_o$, $z_o$ are an object-based coordinate system, and wherein w is a non-zero value scaling factor determined using a homogeneous coordinate system transformation.

8. A method for execution by a graphics processing system for rendering, for display to a viewer upon display means having a pluralilty of display pixels, a surface having a surface marking coincident therewith, the surface and the surface marking to be displayed with an orthographic projection upon a viewing plane, comprising the steps of:

moving the surface marking towards the viewer or, alternatively, moving the surface away from the viewer, by an amount that is function of a parameter (S) and also a scale factor (K) that expresses a relationship between viewer eye coordinate units and display pixel units, wherein the parameter (S) determines a maximum slope for the surface, relative to a viewing plane, such that the step of moving will not cause a portion of the surface marking to be obscured by the surface; and wherein the step of moving includes a step of applying a predetermined transformation ($T'_e$) from a viewer eye coordinate system to a modified viewer eye coordinate system, wherein the scale factor K is given by $$K = \frac{\text{horizontal resolution in pixels}}{\text{width of field of view } (FOV)},$$

wherein $S\delta/2 = S/2K$, where $\delta$ is a distance in the viewer coordinate system that corresponds to a pixel error distance, in the viewing plane, that occurs in drawing the surface marking against the surface, wherein a modified viewer coordinate system z-axis distance value $z'_e$ is given in terms of an unmodified viewer coordinate system z-axis distance value $z_e$ as $$z'_e = z_e + S\delta/2 = z_e + S/2K,$$

and wherein the predetermined transformation $T'_e$ is given by $$T_e = \begin{bmatrix} 1 & 0 & 0 & 0 \\ 0 & 1 & 0 & 0 \\ 0 & 0 & 1 & S/2K \\ 0 & 0 & 0 & 1 \end{bmatrix}.$$

9. A method as set forth in claim 8 wherein S is equal to approximately eight.

10. A method as set forth in claim 8 wherein $(S) = |\Delta z/\Delta x|$, or wherein $(S) = |\Delta z/\Delta y|$, or wherein (S) equals a combination of $|\Delta z/\Delta x|$ and $|\Delta z/\Delta y|$ in an (x, y, z) viewer coordinate system.

11. A method as set forth in claim 8 wherein the transformation $T'_e$ is applied with a set of transformations that transform from object coordinates, to world coordinates ($T_w$), to eye coordinates ($T_e$), to screen coordinates ($T_s$) in accordance with:

$$[wx_s \: wy_s \: wz_s \: w] = [x_o \: y_o \: z_o \: 1] T_w \: T_e \: T'_e \: T_s,$$

wherein $x_s$, $y_s$, $z_s$ are a screen-based coordinate system, wherein $x_o$, $y_o$, $z_o$ are an object-based coordinate system, and wherein w is a non-zero value scaling factor determined using a homogeneous coordinate system transformation.

12. A method for execution by a graphics processing system for rendering, for display to a viewer upon display means having a plurality of display pixels, a surface having a surface marking coincident therewith, the surface and the surface marking to be displayed with a perspective projection upon a viewing plane, comprising the steps of:

moving the surface marking towards the viewer or, alternatively, moving the surface away from the viewer, by an amount that is function of a parameter (S) and also a scale factor (K) that expresses a relationship between viewer eye coordinate units and display pixel units, wherein the parameter (S) determines a maximum slope for the surface, relative to a viewing plane, such that the step of moving will not cause a portion of the surface marking to be obscured by the surface; and wherein the step of moving includes a step of applying a predetermined transformation ($T'_e$) from a viewer eye coordinate system to a modified viewer eye coordinate system, wherein the scale factor K is given by $$K = \frac{\text{horizontal resolution in pixels}}{\text{width of } (FOV) \text{ at a distance of 1 unit from viewer}},$$

wherein a modified viewer coordinate system z-axis distance value $z'_e$ is given in terms of the unmodified viewer coordinate system z-axis distance value $z_e$ as $$z'_e = z_e + S\delta/2 = z_e - z_e S/2K = z_e(1 - S/2K),$$

where $\delta$ is a distance in the viewer coordinate system that corresponds to a pixel error distance, in the viewing plane, that occurs in drawing the surface marking against the surface, and wherein the predetermined transformation $T'_e$ is given by $$T_e = \begin{bmatrix} 1 - S/2K & 0 & 0 & 0 \\ 0 & 1 - S/2K & 0 & 0 \\ 0 & 0 & 1 - S/2K & 0 \\ 0 & 0 & 0 & 1 \end{bmatrix}.$$

13. A method as set forth in claim 12 wherein S is equal to approximately eight.

14. A method as set forth in claim 12 wherein $(S) = |\Delta z/\Delta x|$, or wherein $(S) = |\Delta z/\Delta y|$, or wherein (S) equals a combination of $|\Delta z/\Delta x|$ and $|\Delta z/\Delta y|$ in an (x, y, z) viewer coordinate system.

15. A method as set forth in claim 12 wherein the transformation $T'_e$ is applied with a set of transformations that transform from object coordinates, to world coordinates ($T_w$), to eye coordinates ($T_e$), to screen coordinates ($T_s$) in accordance with:

$$[wx_s \ wy_s \ wz_s \ w] = [x_o \ y_o \ z_o \ 1] T_w \ T_e \ T'_e \ T_s,$$

wherein $x_s$, $y_s$, $z_s$ are a screen-based coordinate system, wherein $x_o$, $y_o$, $z_o$ are an object-based coordinate system, and wherein w is a a non-zero value scaling factor determined using a homogeneous coordinate system transformation.

16. A graphics processing system including display means having a plurality of display pixels for displaying a representation of a surface having a surface marking coincident therewith, said graphics processing system comprising:

means for moving the surface marking towards the viewer or, alternatively, moving the surface away from the viewer, by an amount that is function of a parameter (S) and also a scale factor (K) that expresses a relationship between viewer eye coordinate units and display means pixel units, wherein the parameter (S) determines a maximum slope for the surface, relative to a viewing plane of the display means, such that an operation of the moving means does not cause a portion of the surface marking to be obscured by the surface; and wherein the moving means includes means for applying a predetermined transformation ($T'_e$) from a viewer eye coordinate system to a modified viewer eye coordinate system, the predetermined transformation $T'_e$ being selected as a function of whether a perspective projection or an orthographic projection of the surface and the surface marking upon a viewing plane is performed.

17. A graphics processing system a set forth in claim 16, wherein $(S) = |\Delta z/\Delta x|$, or wherein $(S) = |\Delta z/\Delta y|$, or wherein (S) equals a combination of $|\Delta z/\Delta x|$ and $|\Delta z/\Delta y|$ in an (x, y, z) viewer coordinate system.

18. A graphics processing system as set forth in claim 16 wherein (S) is equal to approximately eight.

19. A graphics processing system as set forth in claim 16 wherein the applying means applies the transformation $T'_e$ also in conjunction with a set of transformations that transform from object coordinates, to world coordinates ($T_w$), to eye coordinates ($T_e$), to screen coordinates ($T_s$) in accordance with:

$$[wx_s \ wy_s \ wz_s \ w] = [x_o \ y_o \ z_o \ 1] T_w \ T_e \ T'_e \ T_s,$$

wherein $x_s$, $y_s$, $z_s$ are a screen-based coordinate system, wherein $x_o$, $y_o$, $z_o$ are an object-based coordinate system, and wherein w is a a non-zero value scaling factor determined using a homogeneous coordinate system transformation.

\* \* \* \* \*